(12) United States Patent
Ebner (10) Patent No.: US 10,082,254 B2
(45) Date of Patent: Sep. 25, 2018

(54) OPTICAL ELEMENT AND A LIGHT-EMITTING ARRANGEMENT WHICH COMPRISES AN OPTICAL ELEMENT

(71) Applicant: ZUMTOBEL LIGHTING GMBH, Dornbirn (AT)

(72) Inventor: Stephan Ebner, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 0 days.

(21) Appl. No.: 15/505,627

(22) PCT Filed: Oct. 29, 2015

(86) PCT No.: PCT/EP2015/075137
§ 371 (c)(1),
(2) Date: Feb. 22, 2017

(87) PCT Pub. No.: WO2016/066753
PCT Pub. Date: May 6, 2016

(65) Prior Publication Data
US 2017/0276302 A1  Sep. 28, 2017

(30) Foreign Application Priority Data
Oct. 30, 2014 (DE) .................. 10 2014 222 169

(51) Int. Cl.
*G02B 26/00* (2006.01)
*G02F 1/29* (2006.01)
(Continued)

(52) U.S. Cl.
CPC .................. *F21K 9/68* (2016.08); *F21K 9/65* (2016.08); *F21V 5/04* (2013.01); *F21V 3/02* (2013.01);
(Continued)

(58) Field of Classification Search
CPC ............ G02B 19/0028; G02B 19/0061; G02B 19/0066; G02B 26/125; G02B 26/123;
(Continued)

(56) References Cited

U.S. PATENT DOCUMENTS 6,739,738 B1  5/2004  Smith
7,712,931 B1  5/2010  Smith
(Continued)

FOREIGN PATENT DOCUMENTS

DE  102012102105  10/2012
DE  102011085275  1/2013
(Continued)

OTHER PUBLICATIONS

German search report on priority German application 10 2014 222 169.2 dated Jun. 11, 2015.
(Continued)

*Primary Examiner* — Brandi Thomas
(74) *Attorney, Agent, or Firm* — Andrus Intellectual Property Law (57) ABSTRACT

The invention relates to an optical element for influencing a light that is emitted from a light source, said optical element extending along a longitudinal axis (L). The optical element comprises a front side which faces away from the light source, and a rear side (5) which faces said light source, a plurality of cell-like light entry regions (4) being designed on the rear side (5) in order for light to enter, and extending in a row along a straight line (G) that runs parallel to the longitudinal axis (L). In addition, a deflecting surface region is designed on said rear side (5) for the purpose of at least partially deflecting the light, said region being connected on a side next to said light entry regions (4) with respect to the straight line (G). A light exit region is designed on the front side such that light can at least partially exit. Said deflecting
(Continued)

surface region extends along the longitudinal axis (L) and comprises surface regions (7) designed such that each of their surface normals forms an angle smaller than or greater than 90° with the longitudinal axis (L). With this orientation of the surface regions (7), fewer beams of light are passed on, in the manner of a light guide, in the optical element in a direction parallel to the longitudinal axis (L) thus resulting in dazzling effects. This therefore reduces the risk of an unwanted dazzling effect. The invention also relates to a corresponding arrangement of emitting light.

15 Claims, 5 Drawing Sheets

(51) Int. Cl.
| | |
|---|---|
| *G02B 26/08* | (2006.01) |
| *F21K 9/68* | (2016.01) |
| *F21K 9/65* | (2016.01) |
| *F21V 5/04* | (2006.01) |
| *F21V 3/02* | (2006.01) |
| *F21Y 115/10* | (2016.01) |
| *F21Y 105/12* | (2016.01) |

(52) U.S. Cl.
CPC ....... *F21Y 2105/12* (2016.08); *F21Y 2115/10* (2016.08)

(58) Field of Classification Search
CPC .... G02B 26/124; G02B 6/0018; G02B 6/002; G02B 6/0031; G02B 6/0081; G02B 6/0088; G02B 6/009; G02B 6/0091
USPC ......... 359/290–292, 298, 811, 813, 815, 819
See application file for complete search history.

(56) References Cited

U.S. PATENT DOCUMENTS

| | | | |
|---|---|---|---|
| 8,434,892 | B2 | 5/2013 | Zwak et al. |
| 9,234,644 | B2 | 1/2016 | Ebner |
| 2005/0111235 | A1 | 5/2005 | Suzuki et al. |
| 2005/0286251 | A1* | 12/2005 | Smith ................... F21S 48/328 362/327 |

FOREIGN PATENT DOCUMENTS

| | | |
|---|---|---|
| DE | 202013006414 | 11/2014 |
| EP | 1167870 | 1/2002 |
| EP | 2827179 | 7/2014 |

OTHER PUBLICATIONS

International Search Report on parent application PCT/EP2015/075137 dated Dec. 18, 2015.

\* cited by examiner

OPTICAL ELEMENT AND A LIGHT-EMITTING ARRANGEMENT WHICH COMPRISES AN OPTICAL ELEMENT

CROSS REFERENCE TO RELATED APPLICATION

The present application is the U.S. national stage application of International Application PCT/EP2015/075137, filed Oct. 29, 2015, which international application was published on May 6, 2016 as International Publication WO 2016/066753 A1. The International Application claims priority to German Patent Application 10 2014 222 169.2, filed Oct. 30, 2014.

FIELD OF THE INVENTION

The invention relates to an optical element and a light-emitting arrangement, which comprises such an optical element.

BACKGROUND

From prior art, light-emitting arrangements are known, which comprise an LED light source (LED: light-emitting diode) and an optical element for influencing light that is emitted from the light source. For example, DE 10 2007 013 082 A1 discloses a signal light having an optical unit designed in the form of a wing-shaped light-guiding element. The optical element comprises a light input surface on its rear side and a light output surface on its front side in main radiation direction in front of the light source. The light output surface comprises a light deflecting portion for deflecting the injected light towards the rear side. The rear side comprises a reflection portion with reflection elements, by means of which the light is deflected in main radiation direction.

The previously known arrangements involve the problem that they can produce a non-negligible amount of stray light. In particular, this can result in unwanted glare effects, which are accompanied by respectively increased UGR values (UGR: unified glare rating).

SUMMARY OF THE INVENTION

The invention is based on the objective of providing an enhanced optical element or, respectively, an enhanced light-emitting arrangement, which reduces the risk of unwanted glare.

According to the invention, this objective is achieved by the subject matter described herein.

The invention provides an optical element for influencing light emitted by a light source. The optical element extends along a longitudinal axis, and has a front side that faces away from the light source, and a rear side that faces the light source. A plurality of cell-like light entry regions are located on the rear side for light to enter and extend in a row along a straight line that runs parallel to the longitudinal axis. In addition, a deflecting surface region is designed on said rear side for the purpose of at least partially deflecting the light, said region being located on the rear side next to said light entry region and extending away from the straight line. A light exit region is designed on the front side in such a way that light can exit at least partially through the exit region. Said deflecting surface region extends parallel to and along the longitudinal axis and comprises inclined surface regions designed in such a way that the normal to each surface forms an angle with the longitudinal axis that is smaller or greater than 90°.

With this orientation of the surface regions, fewer beams of light are passed on, in the manner of a light guide, through the optical element in a direction parallel to the longitudinal axis which would result in dazzling effects or glare. In this way, the risk of an unwanted dazzling effect or glare is reduced.

Preferably, a wavy structure is formed by means of these inclined surface regions, the main orientation of which is aligned parallel the longitudinal axis. In this way, light beams that enter the optical element in different light entry regions are respectively deflected.

Preferably, because of the wavy structure, the inclined surface regions, when viewed along the longitudinal axis, comprise several points that are at a maximum distance from the straight line. These points correlate with the central ranges of the light entry regions. This design allows a particularly large number of light beams, which enter the optical element in a light entry region, to be respectively deflected.

Preferably, the surface regions are formed by rounded structures and/or by plane surfaces which are separated from each other by edges. In this way, the surface regions can be produced in an advantageous manner and effectively designed.

Preferably, the deflecting surface region comprises a plurality of gradations, viewed normal in relation to the longitudinal axis. In this way, the light beams are distributed in a plane normal in relation to the longitudinal axis across a broad region.

Preferably, the inclined surface regions are formed at the gradation that is closest to the straight line. In this way, the wanted deflection of the light beams can be especially effectively achieved.

Preferably, the inclined surface regions are formed only at the gradation that is closest to the straight line. This is advantageous from the aspect of production.

According to a further aspect of the invention, an optical element for influencing a light emitted by a light source is provided, said optical element extending along a longitudinal axis. The optical element comprises a front side, which faces away from the light source, and a rear side, which faces the light source. A plurality of cell-like light entry regions are located on the rear side for light to enter and extend in a row along a straight line that runs parallel to the longitudinal axis. In addition, a deflecting surface region is designed on said rear side for the purpose of at least partially deflecting the light, said region being located on the rear side next to said light entry region extending away from the straight line. A light exit region is designed on the front side in such a way that light can exit at least partially through the light exit region. Each of the cell-like light entry regions comprises at least one surface region on its flank where the surface normal encloses an angle with the longitudinal axis that is greater than 0° and smaller than 90°.

With this orientation of the surface regions on the flank of the light entry region, fewer light beams are passed on, in the manner of a light guide, through the optical element in a direction parallel to the longitudinal axis, which would result in dazzling effects or glare. In this way, the risk of an unwanted dazzling effect or glare is reduced.

Preferably, the optical element at least partially comprises the above-mentioned inventive characteristics.

Preferably, the surface regions of the light entry regions have a rounded design. In this way, the light beams can be distributed especially evenly.

According to a further aspect of the invention, a light-emitting arrangement is provided, which comprises a light source for emitting light and an optical element constructed in accordance with the invention, where the arrangement is designed in such a way that the light enters the optical element at least partially via the light entry regions.

Preferably, the light source comprises at least one LED. To this end, the optical element is especially suitable for use with an LED light source.

The light source can comprise a plurality of light sources, designed in such a way that light from two LEDs enters the optical element via one of the light entry regions.

BRIEF DESCRIPTION OF THE DRAWINGS

Subsequently, the invention is described in more detail by means of an embodiment and in relation to the drawings. It is shown.

DETAILED DESCRIPTION

Figure 1:
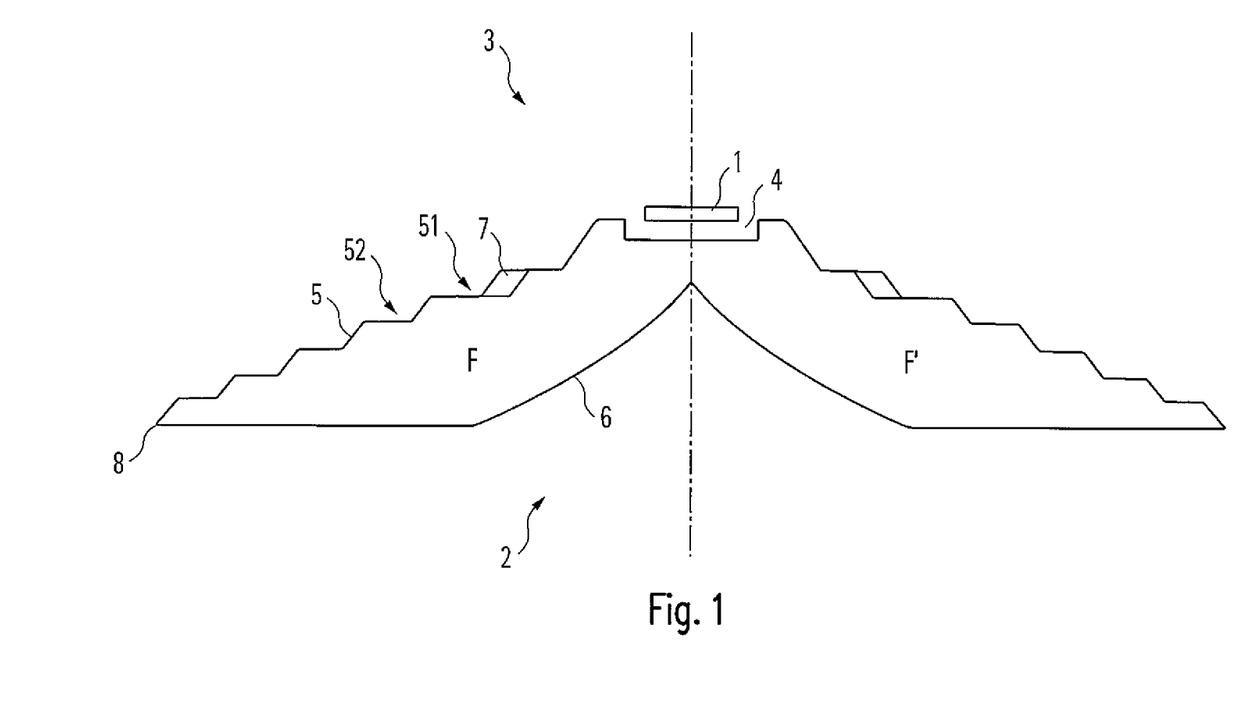
FIG. 1 is a cross section view of an embodiment of an arrangement configured in accordance with the invention.
Figure 2:
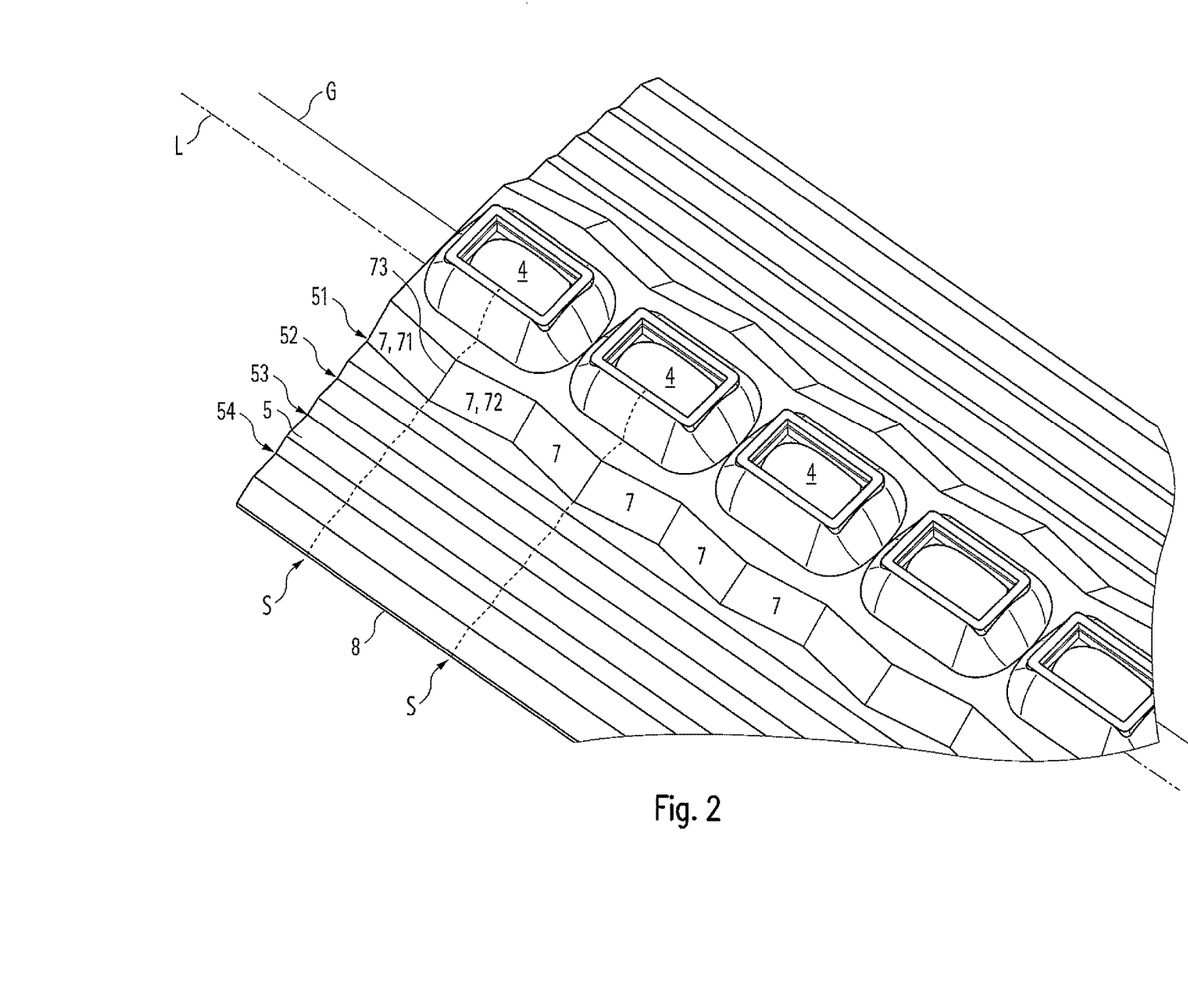
FIG. 2 is a perspective view of an end region of the optical element.

FIG. 2 shows a view of an end region of an embodiment of an optical element constructed in accordance with one aspect of the invention. The optical element extends along a longitudinal axis L. FIG. 1 shows an outline of a cross section normal to the longitudinal axis L. The optical element is designed to influence light emitted from a light source 1 shown in FIG. 1. The optical element comprises a front side 2 facing away from the light source 1 and a rear side 3 facing the light source 1.

Accordingly, a respective light-emitting arrangement comprises the optical element and the light source 1.

Preferably, the light source 1 is an LED light source 1 having at least one LED as a light-emitting element.

A plurality of cell-like light entry regions 4 for the light to enter are located on the rear side 3 of the optical element and extend in a row along a straight line G that runs parallel to the longitudinal axis L. Preferably, respective cup-shaped recesses for light to enter are formed by the light entry regions 4. Preferably, the bottom of the cup shape has a lens-shaped arch.

In addition, a deflecting surface region 5 on the rear side 3 is designed to at least partially deflect the light. Said region is located on the rear side next to said light entry regions 4 and extends away from the straight line G. Preferably, the optical element is formed analogous on the respective opposite side, especially symmetrically in relation to the straight line G.

A light exit region 6 for light to exit at least partially is located on the front side 2 of the optical element.

In the example shown in FIG. 1, in cross section viewed normal in relation to the longitudinal axis L, the optical element has two wing-shaped regions F, F' by means of which the light is at least partially emitted. The light exit regions 6 are designed in such a way that they form a beam splitter for the radiated light. For this purpose, the light radiated via the light entry regions 4 is partially deflected on the light exit region 6 and thereby guided further into the two wing-shaped regions F, F'. In addition, the light on the rear deflecting surface region 5 is deflected a second time and then emitted via the light exit region 6.

As outlined in an exemplary manner in FIG. 2, the deflecting surface region 5 extends along the longitudinal axis L and comprises surface regions 7, which are designed in such a way that the normal to each surface forms an angle with the longitudinal axis L that is smaller or greater than 90°. For reasons of simplicity, these surface regions are depicted as "inclined" surface regions 7. In particular, they can be designed in such a way that the normal for each surface forms an angle with the longitudinal axis L that is smaller than 80° or greater than 100°.

Figure 3:
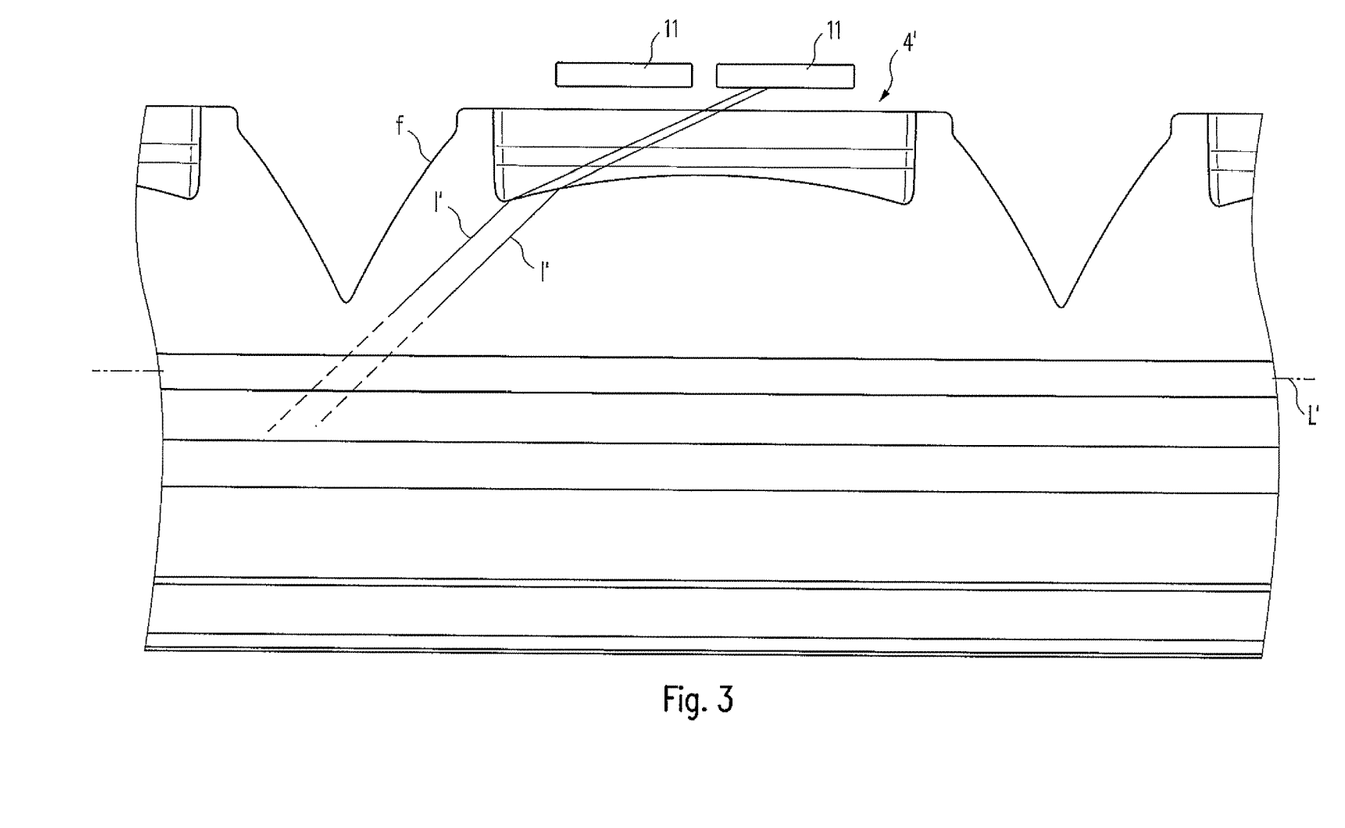
FIG. 3 is a longitudinal section view of a region of a respective optical element, which does not have an inclined surface regions as described in accordance with one aspect of the invention.

To illustrate the effect of these "inclined" surface regions 7, FIG. 3 illustrates part of a longitudinal section in an arrangement that does not have such inclined surface regions. As indicated, light beams 1', which form a relatively small angle with the respective longitudinal axis L' (here also depicted as "flat" light beams), extend in such a way that they do not interact with wall or flank regions of the respective light entry region 4'. Subsequently, these light beams 1' are passed on, in the manner of a light guide, in the respective optical element basically along the longitudinal axis. When these light beams 1' finally leave the optical element, because of their orientation, they can cause an unwanted glare for a viewer of the arrangement.

In an optical element constructed in accordance with one aspect of the invention, respective flat light beams are deflected by the inclined surface regions 7, especially by total internal reflection, and thus are passed on less far in the direction of the longitudinal axis L. Therefore, with respect to the representation of FIG. 3, they leave the optical element in a steeper upward direction, thus the risk of a dazzling effect is reduced.

This effect is especially prevalent when the respective light entry regions 4 extend comparatively far along the longitudinal axis L, for example, as illustrated in FIG. 3, when the light source 1 comprises at least two LEDs 11, 11 arranged along the longitudinal axis and both emit light in one of the light entry regions 4. In other words, in FIG. 3, at least two LEDs 11 are associated with the illustrated light entry region 4 and the other light entry regions 4 as well.

Accordingly, the light entry regions 4 in an optical element constructed in accordance with the invention can be designed in the manner shown in FIG. 3.

Preferably, as indicated in FIG. 2, a wavy structure is formed by means of the surface regions 7, the main extension of which is aligned parallel the longitudinal axis L. Preferably, because of their wavy structure, the surface regions 7 are oriented in such a way that, when viewed along the longitudinal axis L, they comprise at several points S a maximum distance from the straight line G. These points correlate to central ranges of the light entry regions 4. As shown in an exemplary manner in FIG. 2, these points S can align with the light entry regions 4 exactly in the center.

The surface regions 7 can be formed by rounded structures and/or, as shown in FIG. 2, by plane surfaces 71, 72 which are separated from each other by edges. For example, the wavy structure can be designed in such a way that it describes a sinusoidal form.

Preferably, the deflecting surface region 5 also comprises a plurality of gradations 51, 52, 53, 54, viewed normal in relation to the longitudinal axis L. For example, the gradations 51, 52, 53, 54 can be designed such that steps are formed starting from an outer edge 8 of the optical element and extending all the way to the light entry regions 4.

In particular, as described above, the gradations 51, 52, 53, 54 can be designed to deflect the light inside the optical element a second time after being deflected by the light exit region 6.

Preferably, the inclined surface regions 7 are formed at the one of the gradations 51, 52, 53, 54, and most preferably at the graduation 51 that is closest to the straight line G, which is where the wanted effect can be achieved most effectively.

Figure 4A:
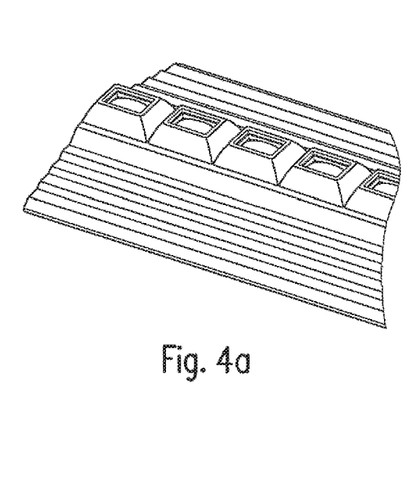
FIG. 4a is a perspective view of a respective optical element, which does not have an inclined surface regions as described in accordance with one aspect of the invention.
Figure 4B:
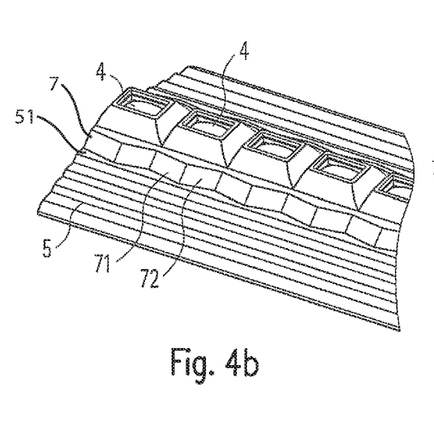
FIG. 4b shows an optical element in accordance with one aspect of the invention, in which the inclined surface regions are formed only at the gradation that is closest to the straight line of the light entry regions.
Figure 4C:
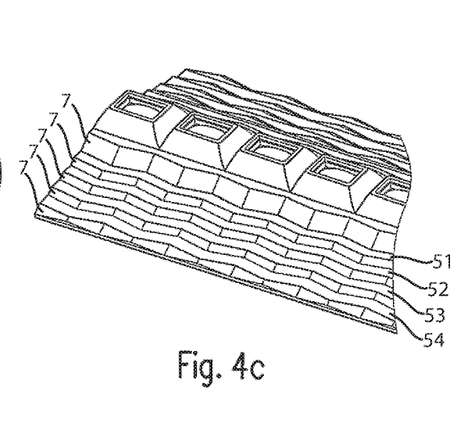
FIG. 4c shows an optical element in accordance with one aspect of the invention, in which inclined surface regions are formed at all gradations.

For further illustration, the optical element shown in FIG. 4a has no surface regions in terms of the present description. FIG. 4b shows an optical element in which the inclined surface regions 7 are formed at the gradation 51 that is closest to the straight line G. And FIG. 4c shows an optical element in which the inclined surface regions 7 are formed at all gradations 51, 52, 53, 54. In this way, it is possible to achieve an even further reduced UGR value. However, the production cost for the embodiment shown in FIG. 4c is comparatively high and therefore the embodiment shown in FIG. 4b is preferred.

Figure 5A:
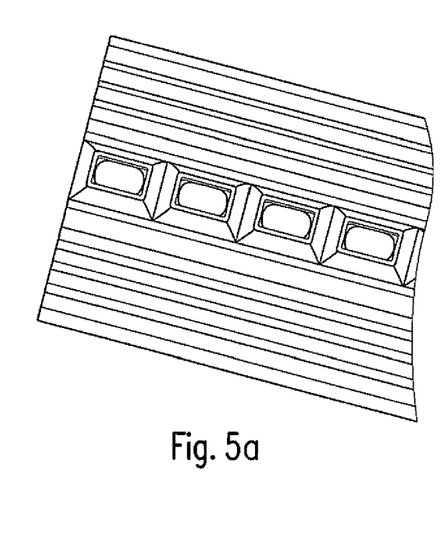
FIG. 5a shows an optical element, which does not have inclined surface regions.
Figure 5B:
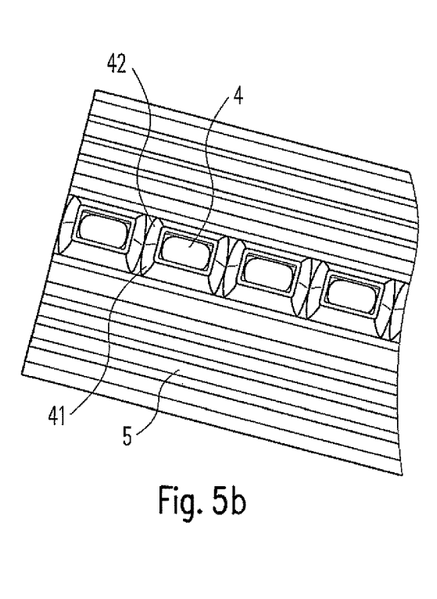
FIG. 5b shows an optical element in accordance with another aspect of the invention, in which the flank regions of the light entry region are designed in a tilted manner.
Figure 5C:
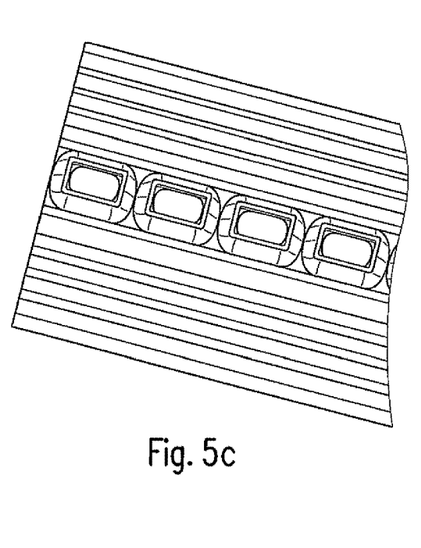
FIG. 5c shows an optical element, in which the flank regions of the light entry region have a rounded design.

Like in FIG. 4a, in FIG. 5a, the illustrated optical element has no inclined surface regions. As shown in FIG. 5b, however, a suitable deflection of flat light beams can also be achieved in that each of the cell-like light entry regions 4 comprises at least one tilted surface region 41, 42, the surface normal of which encloses an angle with the longitudinal axis L that is greater than 0° and smaller than 90°, especially greater than 5° and smaller than 85°. As indicated in FIG. 5b, the surface regions 41, 42 can have a planar design or, as indicated in FIG. 5c, a rounded design.

In other words, the respective flank regions of the light entry regions 4 facing each other are tilted or additionally rounded, as it were. Therefore, each of the flank regions are practically drawn closer to the center of the associated light entry region, which results in the fact that even more of the flat light beams are influenced, especially totally reflected and thus deflected "downward" in terms of the representation of FIG. 3. As a result, the glare control is enhanced for these light beams.

An especially effective glare control can be achieved when the optical element or the light-emitting arrangement comprises the inclined surface region 7, as well as the surface regions 41, 42, as shown in an exemplary manner in the embodiment shown in FIG. 2.

Preferably, the optical element is produced in an injection molding process.

Using the invention, it is possible to achieve a UGR value reduced by 1.6 points, which means that a light using the inventive light-emitting arrangement can be classified in a respectively improved category. For example, if with a respective arrangement, which does not have the inclined surfaces and modified flank regions of the light entry regions, a UGR value of 20.5 is achieved, the respective light is classified in category UGR<22. Using the invention, however, the UGR value can be reduced to 18.9, so that the light can be classified in the improved category UGR<19.

Additionally, the better the glare control of the light, the more the light can be used in applications where visual tasks have stricter glare requirements. Therefore, the range of application of a respective light can be broadened using the invention.

What is claimed is:

1. An optical element for influencing light emitted from a light source (1), said optical element extending along a longitudinal axis (L), which comprises
    a front side (2), which faces away from the light source (1), and
    a rear side (3), which faces said light source (1),
    a plurality of cell-like light entry regions (4) being located on the rear side (3) in order for light to enter, and extending in a row along a straight line (G) that runs parallel to the longitudinal axis (L),
    a deflecting surface region (5) being designed for the purpose of at least partially deflecting the light internally, said deflecting surface region being located on the rear side next to said light entry regions (4) and extending away from the straight line (G), and
    a light exit region (6) located on the front side (2) in such a way that light can at least partially exit through the light exit region (6),
    wherein said deflecting surface (5) extends along the entire length of the optical element generally parallel with the longitudinal axis (L) except for at least one glare reducing structure also extending along the entire length of the optical element formed by adjacent, longitudinally inclined surface regions (7) configured in such a way that a normal to each inclined surface region forms an angle smaller or greater than 90° with the longitudinal axis (L).

2. The optical element according to claim 1, wherein the inclined surface regions (7) of the glare reducing structure are formed by planar surfaces (71, 72) that are separated from each other by edges, and the main orientation of the glare reducing structure is aligned parallel to the longitudinal axis (L).

3. The optical element according to claim 2, in which the inclined surface regions (7), viewed along the longitudinal axis (L), comprise several points (S) that are a maximum distance from the straight line (G) and these points coincide with central ranges of the respective light entry regions (6).

4. The optical element according to claim 1, in which the inclined surface regions (7) are formed by rounded structures.

5. The optical element according to claim 1 in which the deflecting surface region (5) comprises a plurality of gradations (51, 52, 53, 54).

6. The optical element according to claim 5, in which the inclined surface regions (7) are formed at the gradation (51) that is closest to the straight line (G).

7. The optical element according to claim 5, in which the inclined surface regions (7) are formed only at the gradation (51) that is closest to the straight line (G).

8. An optical element for influencing light emitted from a light source (1), said optical element extending along a longitudinal axis (L), which comprises a front side (2), which faces away from the light source (1), and a rear side (3), which faces said light source (1), a plurality of cell-like light entry regions (4) being designed on the rear side (3) in order for light to enter, and extending in a row along a straight line (G) that runs parallel to the longitudinal axis (L), wherein each of the cell-like light entry regions (4) comprises a cup-shaped recess for light to enter where a bottom of the recess has a lens-shaped arch, and a flank where at least a portion an outer surface of the flank faces a portion of the outer surface of the flank of an adjacent cell-like light entry region, a deflecting surface region (5) located for the purpose of at least partially deflecting the light internally, said region being located on the rear side next to said light entry regions (4) and extending away from the straight line (G), and a light exit region (6) being designed on the front side (2) in such a way that light can at least partially exit through the light exit region (6), wherein the outer surface of the flank of each of the cell-like light entry regions (4) comprises at least one tilted surface region (41, 42) such that a normal to the surface encloses an angle with the longitudinal axis (L) that is greater than 0° and smaller than 90°.

9. The optical element according to claim 8, in which the surface regions (41, 42) of the light entry regions (4) have a rounded design.

10. A light-emitting arrangement, which comprises a light source (1) for emitting light and an optical element according to claim 8, the arrangement being designed in such a way that the light at least partially enters the optical element via the light entry regions (4).

11. The arrangement according to claim 10, in which the light source comprises at least one LED.

12. The arrangement according to claim 11, in which the light source comprises a plurality of LEDs that are designed in such a way that the light enters the optical element by way of two LEDs via one of the light entry regions (4).

13. A light-emitting arrangement, which comprises
a light source (1) for emitting light, and
an optical element according to claim 1, the arrangement being designed in such a way that the light at least partially enters the optical element via the light entry regions (4).

14. The arrangement according to claim 13 in which the light source comprises at least one LED.

15. The arrangement according to claim 14 in which the light source comprises a plurality of LEDs that are designed in such a way that the light enters the optical element by way of two LEDs via one of the light entry regions (4).

* * * * *